US009966593B2

(12) United States Patent
Kovalenko et al.

(10) Patent No.: US 9,966,593 B2
(45) Date of Patent: May 8, 2018

(54) SB NANOCRYSTALS OR SB-ALLOY NANOCRYSTALS FOR FAST CHARGE/DISCHARGE LI- AND NA-ION BATTERY ANODES (71) Applicant: Belenos Clean Power Holding AG, Bienne (CH)

(72) Inventors: Maksym V. Kovalenko, Zürich (CH); Marc Walter, Kloten (CH)

(73) Assignee: Belenos Clean Power Holding AG, Bienne (CH)

( * ) Notice: Subject to any disclaimer, the term of this patent is extended or adjusted under 35 U.S.C. 154(b) by 224 days.

(21) Appl. No.: 14/745,976

(22) Filed: Jun. 22, 2015

(65) Prior Publication Data
US 2015/0372287 A1 Dec. 24, 2015

(30) Foreign Application Priority Data

Jun. 23, 2014 (EP) .................................... 14173485

(51) Int. Cl.
*B22F 9/24* (2006.01)
*C22C 12/00* (2006.01)
*H01M 4/04* (2006.01)
*H01M 4/38* (2006.01)
*B22F 1/00* (2006.01)
*H01M 10/0525* (2010.01)
*H01M 4/02* (2006.01)
*H01M 10/054* (2010.01)

(52) U.S. Cl.
CPC ......... *H01M 4/0495* (2013.01); *B22F 1/0018* (2013.01); *B22F 9/24* (2013.01); *C22C 12/00* (2013.01); *H01M 4/38* (2013.01); *B22F 2999/00* (2013.01); *H01M 10/054* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2006/0225535 A1* | 10/2006 | Mainwaring | ......... | B22F 1/0018 75/348 |
| 2007/0020519 A1* | 1/2007 | Kim | ...................... | H01M 4/366 429/213 |
| 2009/0053126 A1* | 2/2009 | Lee | ....................... | B82Y 30/00 423/350 |
| 2009/0191455 A1* | 7/2009 | Gao | .................. | H01M 10/0525 429/149 |
| 2010/0310941 A1* | 12/2010 | Kumta | ..................... | H01B 1/04 429/231.95 |
| 2011/0198541 A1* | 8/2011 | Murai | ................... | C01B 19/007 252/500 |
| 2013/0288128 A1* | 10/2013 | Li | ........................... | H01M 4/26 429/217 |
| 2015/0053897 A1* | 2/2015 | Maurice | ................ | C01G 30/00 252/518.1 |
| 2015/0147650 A1* | 5/2015 | Kovalenko | ............. | H01M 4/38 429/220 |
| 2016/0233490 A1* | 8/2016 | Put | ....................... | H01M 4/131 |

OTHER PUBLICATIONS

Palacin, M. R. Chem. Soc. Rev. 2009, 38, 2565.
Goodenough, J. B.; Kim, Y. Chem. Mater. 2009, 22, 587.
Hayner, C. M.; Zhao, X.; Kung, H. H. Annual Review of Chemical and Biomolecular Engineering 2012, 3, 445.
Park, C.-M.; Kim, J.-H.; Kim, H.; Sohn, H.-J. Chem. Soc. Rev. 2010, 39, 3115.
Zhu, Y.; Han, X.; Xu, Y.; Liu, Y.; Zheng, S.; Xu, K.; Hu, L.; Wang, C. ACS Nano 2013, 7, 6378.
Magasinski, A.; Dixon, P.; Hertzberg, B.; Kvit, A.; Ayala, J.; Yushin, G. Nat. Mater. 2010, 9, 353.
Chockla, A. M.; Klavetter, K. C.; Mullins, C. B.; Korgel, B. A. Chem. Mater. 2012, 24, 3738.
Kovalenko, I.; Zdyrko, B.; Magasinski, A.; Hertzberg, B.; Milicev, Z.; Burtovyy, R.; Luzinov, I.; Yushin, G. Science 2011, 333, 75.
Beattie, S. D.; Larcher, D.; Morcrette, M.; Simon, B.; Tarascon, J. M. Journal of the Electrochemical Society 2008, 155, 158.
Chan, C. K.; Peng, H.; Liu, G.; McIlwrath, K.; Zhang, X. F.; Huggins, R. A.; Cui, Y. Nat. Nanotech. 2008, 3, 31.
Mosby, J. M.; Prieto, A. L. J. Am. Chem. Soc. 2008, 130, 10656.
Alcántara, R.; Jiménez-Mateos, J. M.; Lavela, P.; Tirado, J. L. Electrochemistry Communications 2001, 3, 639.
Klavetter, K. C.; Wood, S. M.; Lin, Y.-M.; Snider, J. L.; Davy, N. C.; Chockla, A. M.; Romanovicz, D. K.; Korgel, B. A.; Lee, J.-W.; Heller, A.; Mullins, C. B. Journal of Power Sources 2013, 238, 123.
Komaba, S.; Matsuura, Y.; Ishikawa, T.; Yabuuchi, N.; Murata, W.; Kuze, S. Electrochemistry Communications 2012, 21, 65.
Ge, P.; Fouletier, M. Solid State Ionics 1988, 28-30, Part 2, 1172.
Cao, Y.; Xiao, L.; Wang, W.; Choi, D.; Nie, Z.; Yu, J.; Saraf, L. V.; Yang, Z.; Liu, J. Adv. Mater. 2011, 23, 3155.
Wang, L.; Lu, Y.; Liu, J.; Xu, M.; Cheng, J.; Zhang, D.; Goodenough, J. B. Angew. Chem. Int. Ed. 2013, 52, 1964.
Park, C.-M.; Yoon, S.; Lee, S.-I.; Kim, J.-H.; Jung, J.-H.; Sohn, H.-J. Journal of the Electrochemical Society 2007, 154, A917.
Caballero, Á.; Morales, J.; Sánchez, L. Journal of Power Sources 2008, 175, 553.
Sung, J. H.; Park, C.-M. J. Electroanal. Chem. 2013, 700, 12.
Park, C.-M.; Sohn, H.-J. Chem. Mater. 2008, 20, 3169.
Darwiche, A.; Marino, C.; Sougrati, M. T.; Fraisse, B.; Stievano, L.; Monconduit, L. J. Am. Chem. Soc. 2013, 135, 10179.
Baggetto, L.; Ganesh, P.; Sun, C.-N.; Meisner, R. A.; Zawodzinski, T. A.; Veith, G. M. Journal of Materials Chemistry A 2013, 1, 7985.

(Continued)

*Primary Examiner* — George Wyszomierski
(74) *Attorney, Agent, or Firm* — Oblon, McClelland, Maier & Neustadt, L.L.P.

(57) ABSTRACT

A method for the production of $SbM_x$ nanoparticles is described that comprises the steps of
  reducing an antimony salt and optionally an alloying metal with a hydride in an anhydrous polar solvent,
  separating the solid product formed from the solution, preferably via centrifugation, and washing the product with water.
M is an element selected from the group consisting of Sn, Ni, Cu, In, Al, Ge, Pb, Bi, Fe, Co, Ga, and $0 \leq x < 2$.

23 Claims, 11 Drawing Sheets (56) References Cited

OTHER PUBLICATIONS

Qian, J.; Chen, Y.; Wu, L.; Cao, Y.; Ai, X.; Yang, H. Chem. Commun. 2012, 48, 7070.
Zhou, X.; Dai, Z.; Bao, J.; Guo, Y.-G. Journal of Materials Chemistry A 2013, 1, 13727.
He, M.; Kravchyk, K.; Walter, M.; Kovalenko, M.V. Nano Lett. 2014, 14, 1255.
Wang, Y. W.; Hong, B. H.; Lee, J. Y.; Kim, J.-S.; Kim, G. H.; Kim, K. S. J. Phys. Chem. B 2004, 108, 16723.
Kieslich, G.; Birkel, C. S.; Stewart, A.; Kolb, U.; Tremel, W. Inorg. Chem. 2011, 50, 6938.
Torisawa, Y.; Nishi, T.; Minamikawa, J. Bioorg. Med. Chem. Lett. 2001, 11, 2787.
European Search Report issued in corresponding application No. 14173485, completed Dec. 12, 2014.
Balan L et al: "A novel solution-phase and low-temperature synthesis of SnSb nano-alloys", Materials Letters, North Holland Publishing Company. Amsterdam, NL, vol. 59, No. 23,Jun. 2, 2005 (2805-06-82), pp. 2898-2902.
Houdayer et al: "Activated hydride-mediated solution phase synthesis of crystallized antimony(0) nanoparticles", Materials Chemistry and Physics, Elsevier SA, Switzerland, Taiwan, Republic of China, vol. 101, No. 2-3, Jan. 26, 2007 (2887-01-26), pp. 404-409.
Kamal Kadel et al: "Solvothermal synthesis and structural characterization of unfilled and Yb-filled cobalt antimony skutterudite", Crystal Research and Technology, vol. 49, No. 2-3, Mar. 6, 2014 (Mar. 6, 2014), pp. 135-141.
Meng He et al: "Monodi sperse Antimony Nanocrystals for High-Rate Li-ion and Na-ion Battery Anodes: Nano versus Bulk", Nano Letters, vol. 14, No. 3, Mar. 12, 2014 (Mar. 12, 2014), pp. 1255-1262.

* cited by examiner

SB NANOCRYSTALS OR SB-ALLOY NANOCRYSTALS FOR FAST CHARGE/DISCHARGE LI- AND NA-ION BATTERY ANODES

This application claims priority from European Patent Application No. 14173485.5 filed on Jun. 23, 2014, the entire disclosure of which is hereby incorporated herein by reference.

TECHNICAL FIELD

The present invention generally relates to an antimony based anode material for a rechargeable battery, to a method for preparing such material and to a battery, in particular a sodium ion or a lithium ion battery comprising such material.

BACKGROUND ART

Li-ion batteries (LIBs) remain the most prominent rechargeable, electrochemical energy storage technology [1], with tremendous importance for portable electronics as well as for the rapidly growing sector of environmentally-benign, electrical mobility [2]. A conceptually identical technology, Na-ion batteries (SIBs), is also emerging as a viable alternative due to much greater natural abundance and more even distribution of Na as compared to Li. The particularly strong appeals of commercialized LIBs are their long operation life span, over hundreds to thousands charge/discharge cycles, and superior and broadly tunable balance between the energy density and the power density [3]. This implies, inter alia, that in the search for alternative Li-ion anode materials not only reversible theoretical charge-storage capacities must be higher than that of Graphite (372 mAh g$^{-1}$), but also satisfactory retention of capacity on a long-term and under fast charge/discharge cycling (high current densities) must be obtained. For instance, the transition from commercial graphite anodes to most intensely studied alternatives such as Si, Ge, Sn and some metal oxides, with 2-10 times higher theoretical capacities (with 3579 mAh g$^{-1}$ for Si being the highest) [4] is primarily hampered by the structural instabilities caused by drastic volumetric changes up to 150-300% upon full lithiation to, e.g., Li$_3$Sb, Li$_{15}$Si$_9$, Li$_{15}$Ge$_4$, Li$_{22}$Sn$_5$ [5] or by slow reaction kinetics. Presently, great research efforts are focusing on nanostructuring of the active material, by producing nanowires, nanoparticles and nanocrystals (NPs and NCs), in order to mitigate the effects of volumetric changes and to enhance the lithiation kinetics [6]-[13]. With regard to SIBs, it is important to note an even greater need for efficient anode materials, because silicon does not reversibly store Na-ions at ambient conditions [14], graphite shows negligible capacities of 30-35 mAh g$^{-1}$ [15], while other carbonaceous materials exhibit capacities of less than 300 mAh g$^{-1}$ at rather low current rates and suffer from the low tap density due to high porosity [12]. Contrary to LIBs, there is much greater progress for the Na-ion cathodes than for Na-ion anodes [16], [17].

In the elemental form, antimony (Sb) has long been considered as a promising anode material for high-energy density LIBs due to high theoretical capacity of 660 mAh g$^{-1}$ upon full lithiation to Li$_3$Sb [3], [4], and has gained a revived interest as mechanically-milled or chemically synthesized nanocomposites [18]-[21], as well as in form of bulk microcrystalline or thin-film material [22], [23]. Furthermore, stable and reversible electrochemical alloying of bulk Sb with Na has also been recently demonstrated [22], pointing to the utility of this element in SIBs as well. Several reports, published in 2012-2013, have demonstrated efficient Na-ion storage in Sb/C fibers [5], mechanically milled Sb/C nanocomposites [24], Sb/carbon nanotube nanocomposites [25] and in thin films [23].

Monodisperse Sb Nanoparticles (NPs) have been found to show outstanding capacity retention and rate capability as anode material in both LIBs and SIBs [26]. However, the synthesis of monodisperse nanoparticles is tedious, expensive and hardly upscalable. A method disclosed in [26] comprises injecting Sb precursor into a hot solution (150 to 200° C.) containing a mixture of trioctylphosphine, lithium-diisopropylamide and oleylamide resulting in the formation of Sb(III)oleylamine that is then reductively decomposed to nanoparticles in a size range of 10 nm to 20 nm.

Also already known is the production of antimony nanowires by self-assembling of Sb nanoparticles [27]. The method comprises formation of very small nanoparticles by dissolving the surfactant PVP and SbCl$_3$ in N,N-dimethyl-formamide and then adding aqueous NaBH$_4$. Aging for several days resulted in nanowires of about 20 nm diameter. Increase of the PVP to SbCl$_3$ ratio from 10:1 to 100:1 resulted in nanowires of 300 nm diameter. Only nanoparticles with an average size of 4 nm are reported.

Another synthesis of Sb nanoparticles is performed by reduction of SbCl$_3$ with lithium triethylboronhydride at room temperature in tetrahydrofurane [28]. This reaction has to be performed under inert conditions, as the employed reducing agent is sensitive to air and moisture. No monodisperse Sb nanoparticles were obtained. Synthesis of mixed antimony nanoparticles starting from such antimony nanoparticles and alloying metal nanoparticles or molecular metal precursor did not result in monodisperse particles either. The particles synthesized by this method were in the range of 20-50 nm [28].

Therefore, the goal was to develop a cheap and facile procedure that allows the gram-scale production of Sb NPs and Sb alloy NPs (SbM$_x$ NPs) showing at least the same electrochemical performance as monodisperse NPs.

DISCLOSURE OF THE INVENTION

Hence, it is a general object of the invention to provide a method for the production of SbM$_x$ nanoparticles, wherein M is an element selected from the group consisting of Sn, Ni, Cu, In, Al, Ge, Pb, Bi, Fe, Co, Ga, and $0 \leq x < 2$.

Now, in order to implement these and still further objects of the invention, which will become more readily apparent as the description proceeds, the method for the production of SbM$_x$ nanoparticles, wherein M is an element selected from the group consisting of Sn, Ni, Cu, In, Al, Ge, Pb, Bi, Fe, Co, Ga, and $0 \leq x < 2$ is manifested by the steps of reducing an antimony salt and optionally an alloying metal with a hydride in an anhydrous polar solvent with a boiling temperature higher than the reaction temperature, the polar solvent further being stable in the presence of a strong reducing agent, separating the solid product formed from the solution, preferably via centrifugation, and washing the product with water.

It is a further object of the invention to provide an anode comprising an antimony based anode material obtained by the method of the present invention as well as a rechargeable sodium ion or lithium ion battery comprising such anode and a cathode.

In one embodiment x is 0.

In another embodiment M is Sn and x is >0, and in a more preferred embodiment M is Sn and x is about 1.

The reduction reaction is preferably performed at elevated reaction temperature such as at a temperature of 60±10° C.

Examples for suitable hydrides are $NaBH_4$, lithium hydride, sodium hydride, potassium hydride, magnesium hydride, calcium hydride, tributyltinhydride, diisobutyl aluminum hydride, lithium aluminum hydride, lithium triethylborohydride and mixtures thereof. A preferred hydride is $NaBH_4$. Lithium triethylborohydride is less preferred because of its sensitivity to air and moisture.

Examples for anhydrous polar solvents are 1-methyl-2-pyrrolidone (NMP), hexamethylphosphoramide, 1,3-dimethyl-2-imidazolidinone, 1,3-dimethyl-3,4,5,6-tetrahydro-2 (1H)-pyrimidinone, linear ether such as glyme but not limited thereto, sulfoxide such as dimethylsulfoxide or sulfolane but not limited thereto, and mixtures thereof, in particular NMP.

Examples for suitable antimony salts are antimony chloride, antimony fluoride, antimony bromide, antimony iodide, antimony oxide or antimony sulfide, antimony sulfate, antimony acetate, potassium antimony tartrate hydrate, triphenylantimony, antimony ethoxide and mixtures thereof, in particular antimony chloride.

Examples for suitable alloying metal salts are tin chloride ($SnCl_2$), tin fluoride, tin bromide, tin iodide, tin oxide, tin sulfide, sodium stannate trihydrate, tetrabutyltin, chlorides of Ni, Cu, In, Al, Ge, Pb, Bi, Fe, Co, Ga and mixtures thereof, in particular mixtures of tin salts. The presently most preferred alloying metal salt is tin chloride.

The reduction reaction may be performed in inert gas, in particular argon, but—unless one of the starting materials is air sensitive such as lithium triethylborohydride—can also be performed in air.

In a preferred method a solution of hydride in anhydrous polar solvent and at least one solution of one or more metal salt(s) in anhydrous polar solvent is prepared that are then combined to start the reduction reaction.

In one embodiment the solution of hydride is heated to the reaction temperature. When the reaction temperature is reached, the reduction reaction is started by quick injection of the one or more salt solutions into the solution of hydride. Quick means that addition was performed with highest possible speed and without interruption. In the reaction mixture, generate by adding the one or more metal salt to the hydride, NPs are formed instantaneously.

In an also preferred embodiment the reaction mixture formed by combining the metal salt solution with the hydride solution is cooled to room temperature immediately after injection of the one or more metal salt solutions.

Prior to using the $SbM_x$ NPs as anode material, they are dried in a vacuum oven at room temperature, optionally with a previously performed additional washing step using a low boiling water miscible solvent like acetone.

An anode may be prepared by mixing $SbM_x$ NPs obtained as described above, carbon black, carboxy methyl cellulose (CMC) and demineralized water, preferably by using a ball-mill for e.g. 1 h. The aqueous slurry obtained is then coated on a current collector like a Cu current collector, and subsequently dried, e.g. overnight at 80° C. under vacuum.

Using such an anode, an LIB or a SIB may be produced according to procedures well known in the art.

BRIEF DESCRIPTION OF THE DRAWINGS

The invention will be better understood and objects other than those set forth above will become apparent when consideration is given to the following detailed description thereof. This description makes reference to the annexed drawings which show.

MODES FOR CARRYING OUT THE INVENTION

In a typical synthesis of $SbM_x$ NPs, in particular Sb NPs or SnSb NPs, a suitable amount of a hydride such as $NaBH_4$ is dissolved in an appropriate amount of anhydrous polar solvent such as 1-methyl-2-pyrrolidone (NMP) and heated while stirred. Upon reaching the desired temperature, such as 60° C., a solution of an antimony salt such as $SbCl_3$ in anhydrous solvent such as NMP is injected quickly. If alloy particles are desired, a solution of a suitable salt of an alloying metal, such as $SnCl_2$, in anhydrous polar solvent such as NMP is injected prior to or simultaneously with or after the Sb containing solution. The reaction mixture turns black immediately, indicating the formation of SbM NPs. After the injection the suspension is cooled to room temperature, e.g. with a water-ice bath. The obtained material is separated from the solution by centrifugation and washed three times with 30 mL demineralized water to remove unreacted $NaBH_4$ and water-soluble side-products such as NaCl. The reaction product is finally washed with 10 mL acetone for easier removal of residual water and dried in the vacuum oven at room temperature. Typically the reaction yields the desired product in amounts of 80±5%.

In the above indicated method the following chemicals in general are suitably applied to obtain Sb NPs or SbM NPs of comparable quality and quantity:

I. As anhydrous solvent other than NMP:

Any amide such as hexamethylphosphoramide, 1,3-dimethyl-2-imidazolidinone or 1,3-dimethyl-3,4,5,6-tetrahydro-2(1H)-pyrimidinone.

II. As substitution for $NaBH_4$:

Any alkali or earth alkali hydride such as lithium hydride, sodium hydride, potasium hydride, magnesium hydride, calcium hydride or other metal hydrides such as tributyltinhydride, diisobutyl aluminum hydride, lithium aluminum hydride or lithium triethylborohydride.

III. As Substitution for $SbCl_3$:

Any antimony halogenide such as antimony fluoride, antimony bromide, antimony iodide; any antimony oxide or chalcogenide such as antimony oxide or antimony sulfide; any other inorganic antimony salt such as antimony sulfate; any organic antimony salt such as antimony acetate or potassium antimony tartrate hydrate; any organic antimony compound such as triphenylantimony or antimony ethoxide.

IV. To obtain $SbM_x$ NPs of a quality and quantity comparable to Sb NPs, the Sb salt may be partially substituted by a Sn salt, especially $SnCl_2$, or any other tin halogenide such as tin fluoride, tin bromide, tin iodide; any tin chalcogenide such as tin oxide or tin sulfide; any other inorganic tin salt such as sodium stannate trihydrate, any other organic tin compound such as tetrabutyltin, or part of the Sb salt might be substituted by other metal chlorides, or generally metal compounds, to yield metal antimony alloy nanoparticles.

The above indicated chemicals may be used alone or in combination with one or more other members of their respective group I to IV.

The particles sizes may be influenced by several characteristics such as amount of hydride, reaction temperature and cooling speed.

Depending on the amount of $NaBH_4$ employed the size of the NPs can be varied, i.e. the higher the amount of $NaBH_4$ the smaller the particles. In addition, to produce NPs of small sizes with high yield an excess of $NaBH_4$ is necessary. Whereas for reactions using more than equimolar amounts of $NaBH_4$ the reaction yield is at least 80%, it drops to 31% when employing only 1 mmol of $NaBH_4$ per 1 mmol of Sb and optionally alloying metal salt.

Sb NPs can also be produced at room temperature, however, the formation of smaller NPs is likely to be favored at elevated temperatures.

Sb NPs with a diameter of approximately 10 nm can be obtained by employing a seven fold excess of $NaBH_4$ as reducing agent and fast cooling down directly after the injection of the $SbCl_3$ and optionally alloying salts. The fast cooling down can be achieved by any adequate cooling technique known to the person skilled in the art.

In addition, it has been found that $SbM_x$ NPs of comparable quality and yield can be obtained by performing the synthesis in air which significantly reduces the costs (material as well as working hours). If working in air, the use of air sensitive reagents such as lithium triethylborohydride should be avoided.

Besides of being easy to perform and comparatively cheap the method of the present invention has several advantages compared with methods described in literature. The advantages of this synthetic procedure compared to the two most similar publications are the following:

I. No surfactant needs to be used: In Wang et al. [27], PVP is employed as surfactant to obtain Sb NPs. In Kieslich et al. [28] no surfactant is used, but in contrast to Kieslich et al. [28] with the herein described method also particles smaller than 20-50 nm can be obtained.

II. Reaction can also be done in air: In Kieslich et al. the reaction is performed under inert conditions, as the employed reducing agent is sensitive to air and moisture.

III. Inexpensive and safe chemicals: the herein preferably used $NaBH_4$ is the least expensive metal hydride, unlike Kieslich et al. [28] that employed lithium triethylboronhydride. In Wang et al. [27] $NaBH_4$ in dimethylformamide is used, however, this mixture is generally considered unsafe, unlike $NaBH_4$ in NMP (see [29]). Thus, in the present case, dimethylformamide is excluded from the list of applicable solvents.

IV. Washing procedure: In the inventive procedure $SbM_x$ NPs are simply washed with water in air, whereas in Kieslich et al. [29] particles are washed with THF in a glovebox.

V. High yield: Per batch (60 mL of solvent) 1.2 g of $SbM_x$ NPs can be produced corresponding to 82% yield with the herein described procedure. In Wang et al. [27] the maximal yield per batch (50 mL of solvent) is limited to 6.1 mg Sb NPs. In Kieslich et al. [28] no reaction yield is mentioned.

VI. Depending on the excess of $NaBH_4$ used and the reaction temperature, the size of the particles can be tuned: In Wang et al. particles with an average size of 4 nm are reported. In Kieslich et al. [28] particles in the range 20-50 nm are synthesized. In both cases no variation of the size with the reaction conditions is described.

Although the method of this invention is preferred for synthesizing metal nanoparticles, it may also be used together with a subsequent oxidizing step resulting in $SbO_y$ NPs or $SbM_xO_y$ NPs with the oxygen content (y) varying up to at most about 3. Depending on the alloying metal also such oxides can be suitable as electrochemically active materials.

An anode may be prepared by mixing $SbM_x$ NPs, carbon black, CMC and demineralized water, preferably by using a ball-mill for e.g. 1 h. The aqueous slurry obtained is then coated on a current collector like a Cu current collector, and subsequently dried, e.g. overnight at 80° C. under vacuum.

Experimental Part

I. Materials Used

Chemicals and solvents: Acetone (99.5%, Sigma Aldrich), antimony (III) chloride (99.9%, ABCR), 1-methyl-2-pyrrolidone (NMP, anhydrous, 99.5%, Acros Organics), sodium borohydride (99%, Sigma Aldrich).

Battery components: Carbon black (Super C65, provided by TIMCAL), 1 M solution of $LiPF_6$ in ethylene carbonate/dimethyl carbonate (EC/DMC, Novolyte), $NaClO_4$ (98%, Alfa Aesar), propylene carbonate (PC, BASF), ethylene carbonate (Novolyte), diethyl carbonate (>99%, Aldrich), 4-Fluoro-1,3-dioxolan-2-one (FEC, >98.0%, TCI), Celgard separator (Celgard 2320, 20 µm microporous trilayer membrane (PP/PE/PP), Celgard Inc. USA) and glass-fiber separator (EUJ-grade, Hollingsworth & Vose Company Ltd., United Kingdom), carboxymethyl cellulose (CMC, Grade: 2200, Lot No. B1118282, Daicel Fine Chem Ltd).

II. Methods

Synthesis of $SbM_x$ NPs

Example 1: Synthesis of Sb NPs

Figure 1:
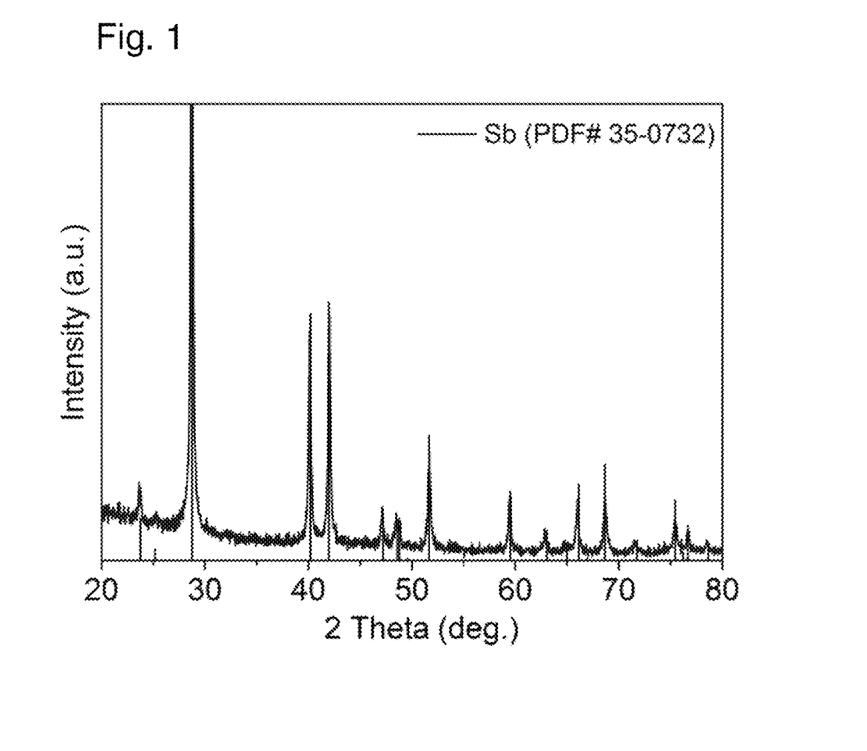
FIG. 1. XRD pattern of Sb NPs synthesized by injection of $SbCl_3$ into a solution of $NaBH_4$ in NMP.

In a typical synthesis of Sb NPs, 8 mmol of $NaBH_4$ were dissolved in 17 mL anhydrous NMP and heated to 60° C. under Ar, while stirred mechanically. Upon reaching 60° C. 3 mL of a solution of 2 mmol $SbCl_3$ in anhydrous NMP were injected quickly. The solution of metal salts could be heated first and then the hydride solution could be injected into it. However, this alternative is not preferred because of the higher solubility of metal salts in NMP and because of the larger volume to inject. The reaction mixture turned black immediately, indicating the formation of Sb NPs. After the injection the suspension was cooled to room temperature by with a water-ice bath. The obtained material was separated from the solution by centrifugation and washed three times with 30 mL demineralized water to remove unreacted $NaBH_4$ and water-soluble side-products such as NaCl. The reaction product was finally washed with 10 mL acetone for easier removal of residual water and dried in the vacuum oven at room temperature. Typically the reaction yield was 200 mg (83%). The XRD pattern of the obtained product showed only peaks corresponding to crystalline Sb (FIG. 1). No traces of crystalline Sb oxide could be detected. Further, by XRD no other species that might be present such as $NaBH_4$, NaCl or borates were observed, indicating the successful washing of the NPs. Analysis of the reaction product by TEM showed that particles were polydisperse with sizes in the 20 nm range (FIG. 2C). In accordance, the crystallite size calculated with the Scherrer equation was 27 nm.

Remarks on the Synthetic Procedure

Figure 2:
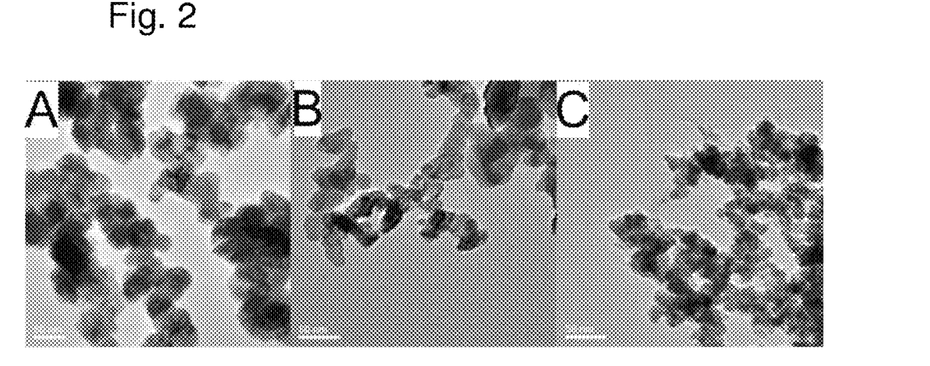
FIG. 2. TEM images of Sb NPs synthesized with different amounts of $NaBH_4$:
A) 1 mmol, B) 2 mmol, C) 8 mmol FIG. 3. TEM images of Sb NPs synthesized according to the upscaled procedure.

I. Depending on the amount of $NaBH_4$ employed the size of the NPs could be varied. To produce NPs of small sizes with high yield an excess of $NaBH_4$ was necessary (FIG. 2). Whereas for reactions using 2 mmol of $NaBH_4$ or more the reaction yield was at least 80%, it dropped to 31% when employing only 1 mmol of $NaBH_4$.

Figure 3:
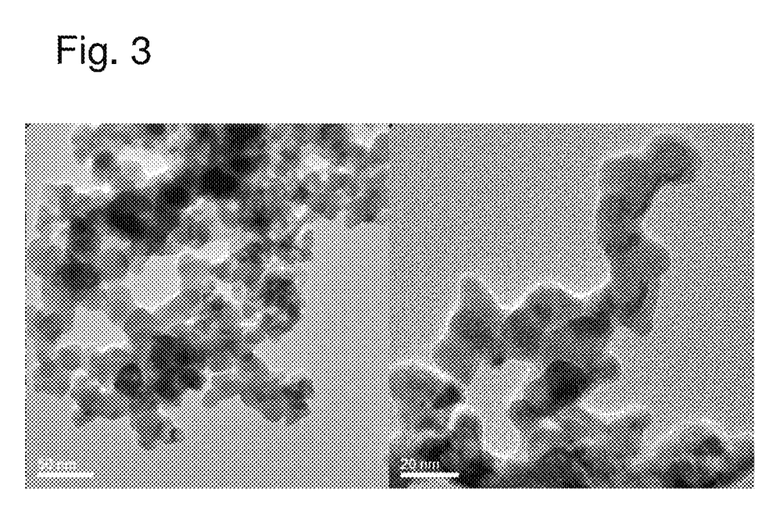

II. Sb NPs on a gram-scale could be synthesized by performing the exact same procedure, but using 46 mmol of $NaBH_4$ in 51 mL of anhydrous NMP and a solution of 12 mmol $SbCl_3$ in 9 mL anhydrous NMP. Sb NPs with similar sizes according to TEM and XRD were obtained with typically 1.2 g (82%) yield (FIG. 3).

Figure 4:
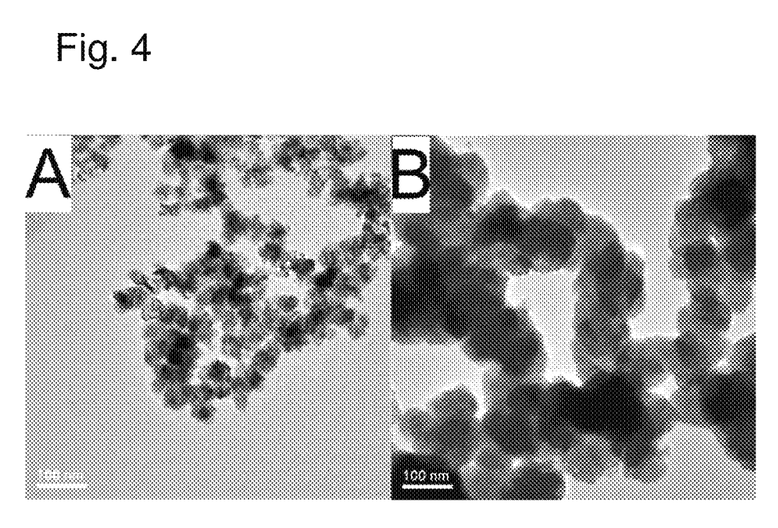
FIG. 4. TEM images of Sb NPs synthesized either at 60° C. (A) or 25° C. (B) using 4 mmol of $NaBH_4$.

III. Sb NPs could also be produced at room temperature, however, the direct comparison with the synthesis at 60° C. showed the formation of smaller NPs was favored at elevated temperatures (FIG. 4).

Figure 5:
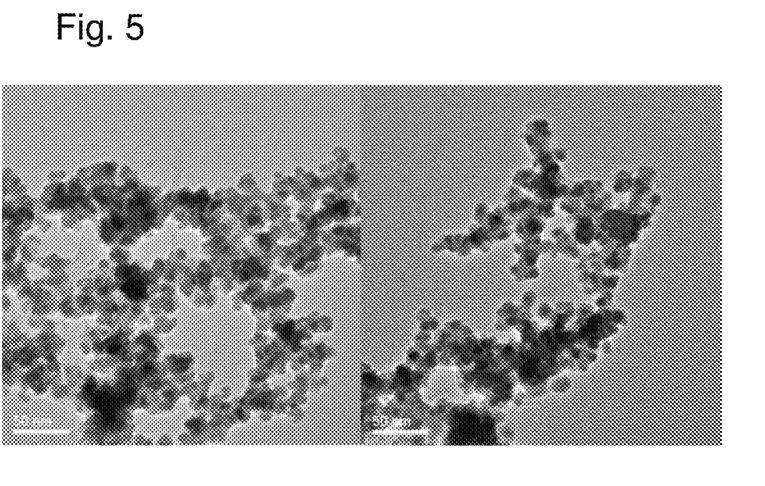
FIG. 5. TEM image of Sb NPs synthesized according to the procedure described in Example 1-IV.

IV. Sb NPs with a diameter of approximately 10 nm could be obtained by employing 16 mmol of $NaBH_4$ as reducing agent and adding directly after the injection of the $SbCl_3$ 10 mL of acetonitrile for fast cooling down (FIG. 5).

Figure 6:
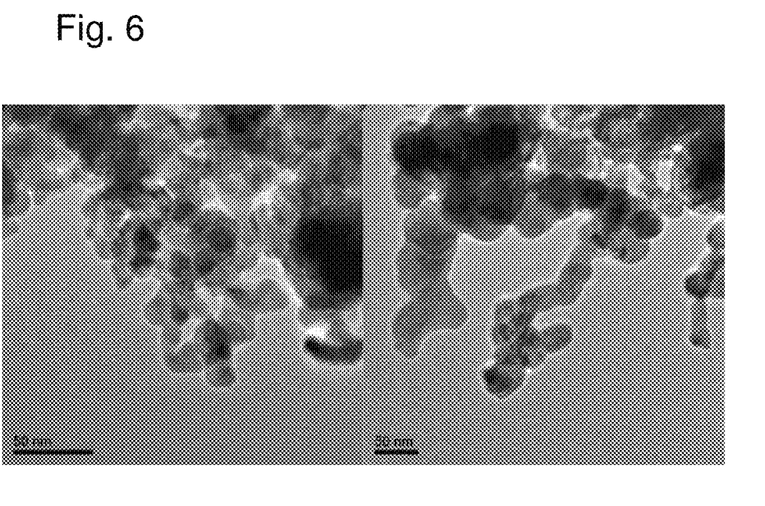
FIG. 6. TEM images of Sb NPs synthesized in air.

V. Sb NPs of comparable quality and yield could be obtained by performing the synthesis in air (FIG. 6).

Variation of chemicals. The following chemicals may be applied to obtain Sb NPs of comparable quality and quantity:

I. As Substitution for NMP:

Any amide such as hexamethylphosphoramide, 1,3-dimethyl-2-imidazolidinone or 1,3-dimethyl-3,4,5,6-tetrahydro-2(1H)-pyrimidinone, and excluding N,N-dimethylformamide for safety reasons, any linear ether such as glyme, diglyme, triethylene glycol dimethyl ether, any sulfoxide such as dimethylsulfoxide, sulfolane.

II. As Substitution for $NaBH_4$:

Any alkali or earth alkali hydride such as lithium hydride, sodium hydride, potassium hydride, magnesium hydride, calcium hydride or other metal hydrides such as tributyltinhydride, diisobutyl aluminum hydride, lithium aluminum hydride or lithium triethylborohydride.

III. As Substitution for $SbCl_3$:

Any antimony halogenide such as antimony fluoride, antimony bromide, antimony iodide; any antimony chalcogenide such as antimony oxide or antimony sulfide; any other inorganic antimony salt such as antimony sulfate; any organic antimony salt such as antimony acetate or potassium antimony tartrate hydrate; any organic antimony compound such as triphenylantimony or antimony ethoxide.

Example 2: Synthesis of SnSb NPs

Figure 7:
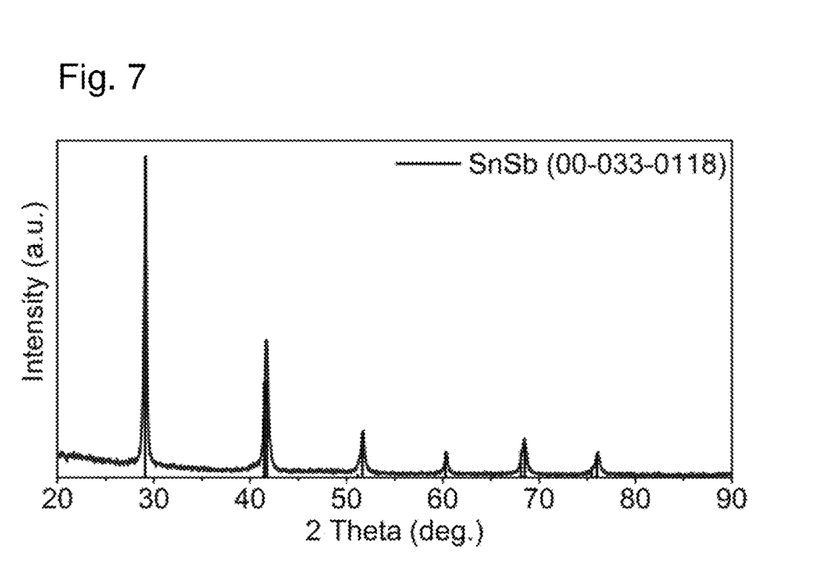
FIG. 7. XRD pattern of SnSb NPs synthesized by injection of $SnCl_2$ and $SbCl_3$ into a solution of $NaBH_4$ in NMP.
Figure 8:
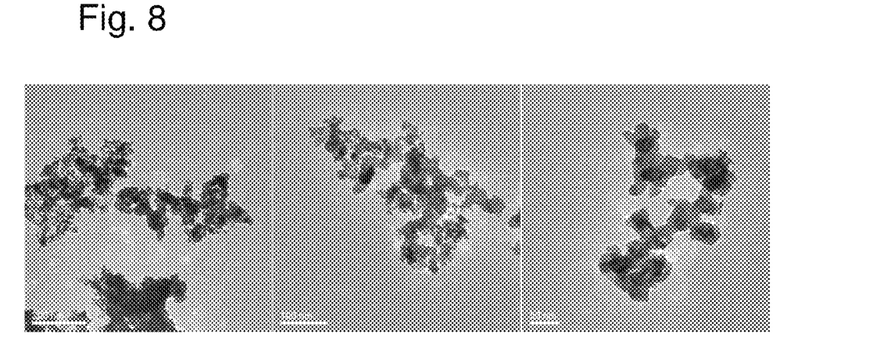
FIG. 8. TEM images of SnSb NPs.

In a typical synthesis of SnSb NPs, 16 mmol $NaBH_4$ were dissolved in 17 mL anhydrous NMP and heated to 60° C. under Ar, while stirred mechanically. Upon reaching 60° C. 1.5 mL of a solution of 1 mmol $SnCl_2$ in anhydrous NMP were injected. Afterwards 1.5 mL of a solution of 1 mmol of $SbCl_3$ in anhydrous NMP were added. The reaction mixture is cooled down immediately to room temperature using a water-ice bath. The obtained material was separated from the solution by centrifugation and washed three times with 30 mL demineralized water to remove unreacted $NaBH_4$ and water-soluble side-products such as NaCl. The reaction product was finally washed with 10 mL acetone for easier removal of residual water and dried in the vacuum oven at room temperature. Typically SnSb NPs with 194 mg (80%) yield were obtained. The XRD pattern of the obtained product showed only peaks corresponding to crystalline SnSb (FIG. 7). No traces of pure crystalline Sb or Sn could be detected. Further, by XRD no other species that might be present such as $NaBH_4$, NaCl or borates were observed, indicating the successful washing of the NPs. Using the Scherrer equation an average size of 41 nm was determined from the XRD pattern. In accordance analysis of the reaction product by TEM showed that the particles were polydisperse with sizes in the 40 nm range (FIG. 8).

Variation of chemicals. To obtain SnSb NPs of comparable quality and quantity $SnCl_2$ may be substituted by the following chemicals: Any tin halogenide such as tin fluoride, tin bromide, tin iodide; any tin chalcogenide such as tin oxide or tin sulfide; any other inorganic tin salt such as sodium stannate trihydrate, any other organic tin compound such as tetrabutyltin.

Further, $SnCl_2$ may also be substituted by other metal chlorides, or generally metal compounds, to yield metal antimony alloy nanoparticles.

Preparation of Sb-Based Electrodes and Electrochemical Testing

In a typical electrode preparation, Sb NPs or SnSb NPs, carbon black, CMC and demineralized water were mixed by ball-milling for 1 h using a Fritsch Pulverisette 7 classic planetary mill (composition: 63.75 wt % Sb or SnSb, 21.25 wt % CB and 15 wt % CMC). The aqueous slurries were coated on Cu current collectors, which were subsequently dried overnight at 80° C. under vacuum prior to use. All electrochemical measurements were conducted in homemade, reusable and air-tight coin-type cells. Batteries were assembled in an Ar-filled glove box ($O_2$<0.1 ppm, $H_2O$<0.1 ppm). Elemental lithium or sodium was employed as both reference and counter electrode. For Li-ion half cells, both Celgard and glass fiber separator were employed, whereas for Na-ion half cells only glass fiber separator was used. 1 M $LiPF_6$ in EC:DMC (1:1 by wt.) with 3% FEC served as electrolyte for Li-ion and 1 M $NaClO_4$ in PC with 10% FEC (Sb) or 3% FEC (SnSb) served as electrolyte for Na-ion half-cells. All galvanostatic measurements were conducted on MPG2 multi-channel workstation (BioLogic) with between 0.02 and 1.5 V. The obtained capacities were normalized by the mass of employed Sb NPs or SnSb NPs.

III. Characterization

Transmission Electron Microscopy (TEM) images were obtained with a Philips CM30 TEM microscope at 300 kV using carbon-coated TEM grids (Ted-Pella). Powder X-ray diffraction (XRD) was measured on a STOE STADI P powder X-ray diffractometer. The crystallite size x was estimated using the Scherrer equation:

$$x = \frac{K \cdot \lambda}{\beta \cdot \cos\theta}$$

K is the shape factor. $\lambda$ is the X-ray wavelength (Cu—K$\alpha$ 1=1.540598 Å). $\beta$ is the full width at half the maximum intensity and $\theta$ is the Bragg angle.

IV. Electrochemical Results

Sb NPs Based Anodes

Figure 9:
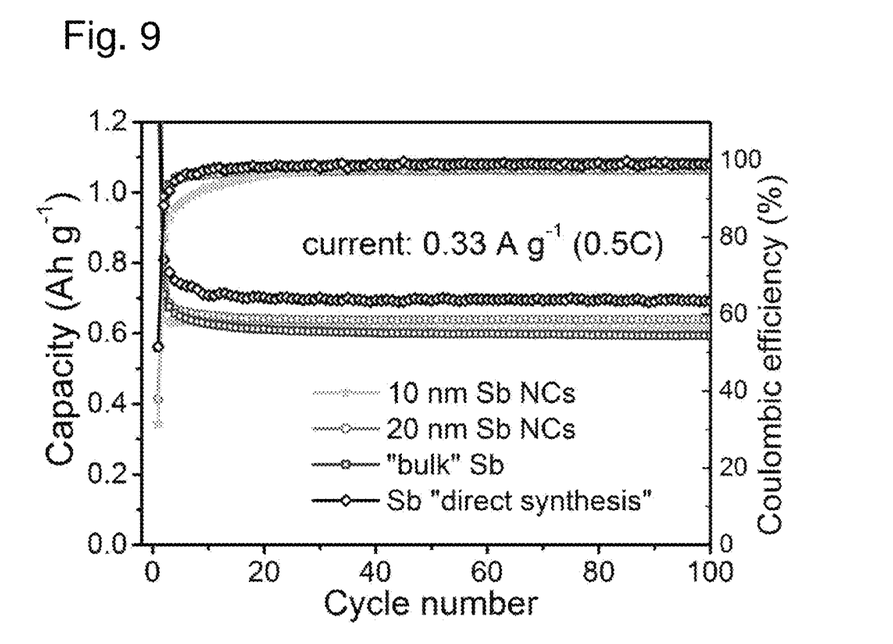
FIG. 9. Capacity retention for Sb-based anodes in Li-ion half-cells at a rate of 0.5 C.
Figure 10:
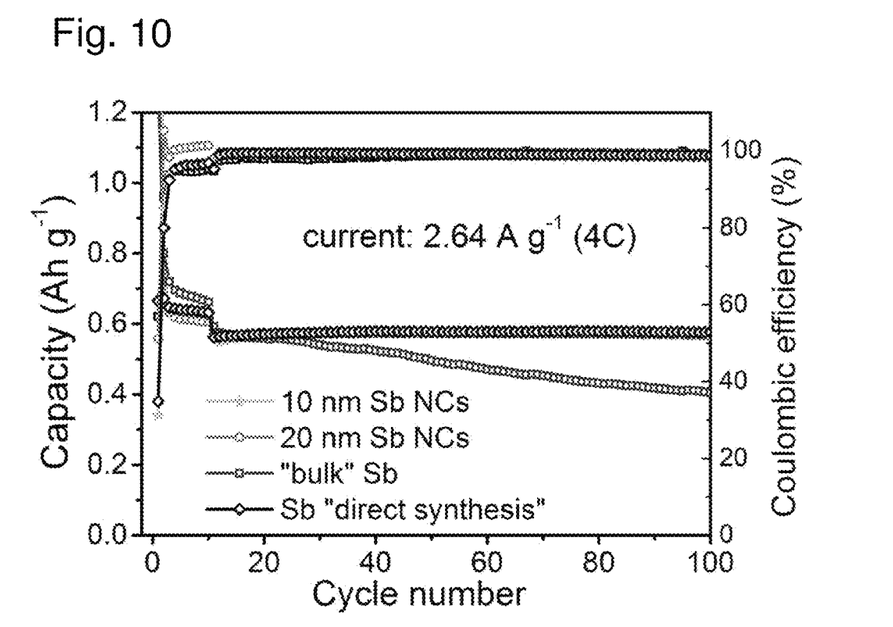
FIG. 10. Capacity retention for Sb-based anodes in Li-ion half-cells at a rate of 4 C with initial conditioning cycles (2 cycles at 0.1 C+8 cycles at 0.5 C).
Figure 11:
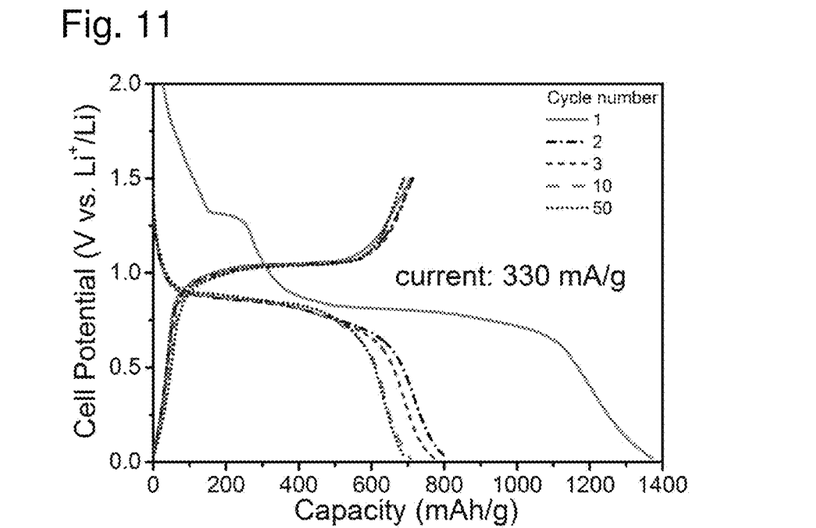
FIG. 11. Galvanic charge and discharge curves for Sb NPs from "direct synthesis" corresponding to FIG. 9.
Figure 12:
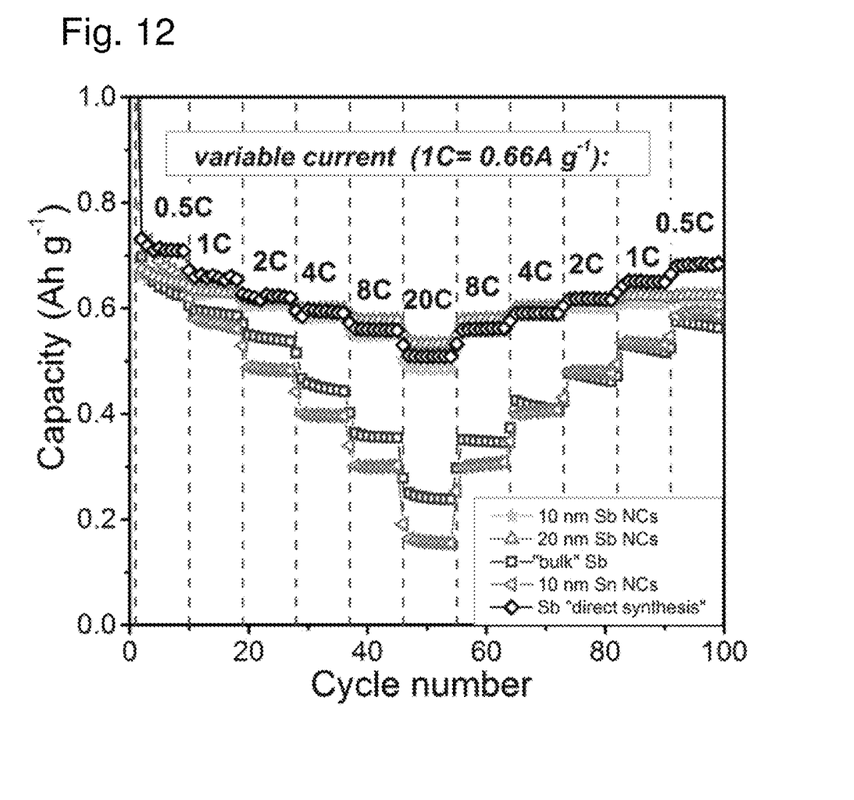
FIG. 12. Rate capability measurements for Sb-based anodes in Li-ion half cells.
Figure 13:
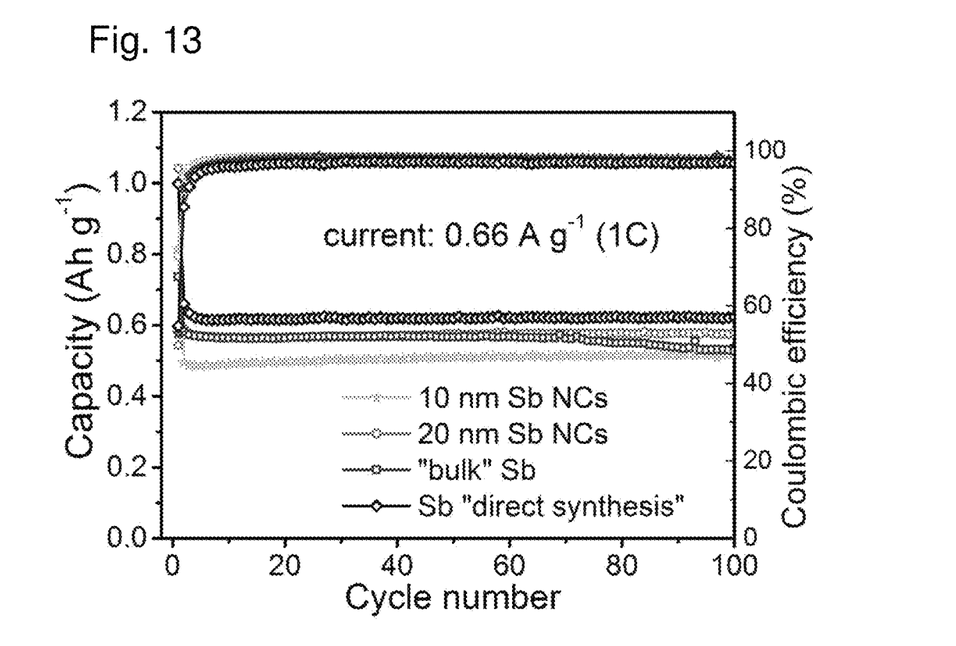
FIG. 13. Capacity retention for Sb-based anodes in Na-ion half-cells at a rate of 1 C.
Figure 14:
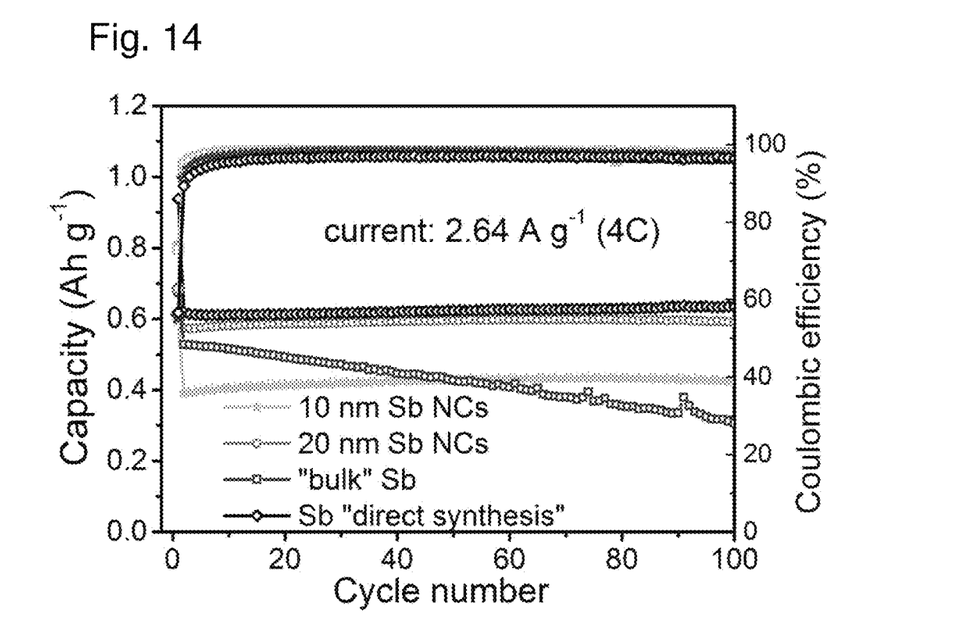
FIG. 14. Capacity retention for Sb-based anodes in Na-ion half-cells at a rate of 4 C.
Figure 15:
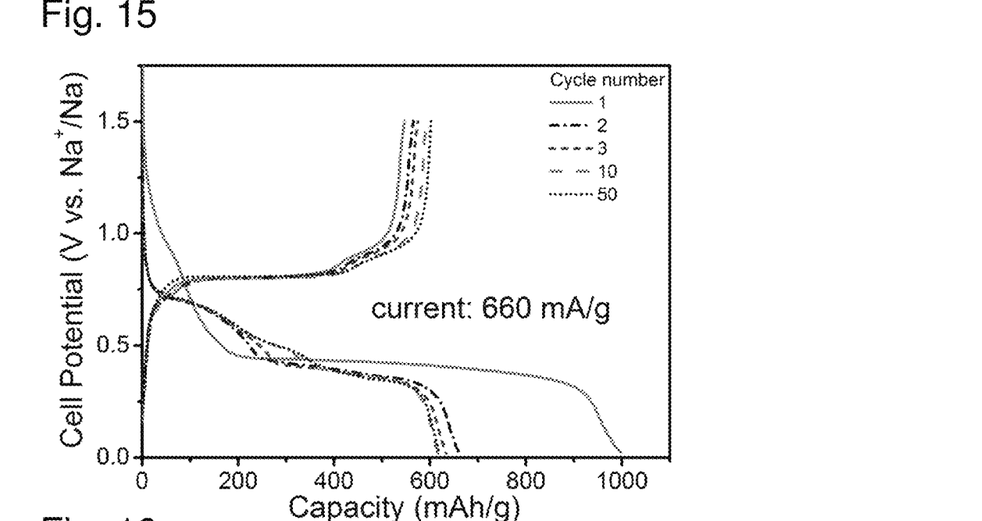
FIG. 15. Galvanic charge and discharge curves for Sb NPs from "direct synthesis" corresponding to FIG. 13.
Figure 16:
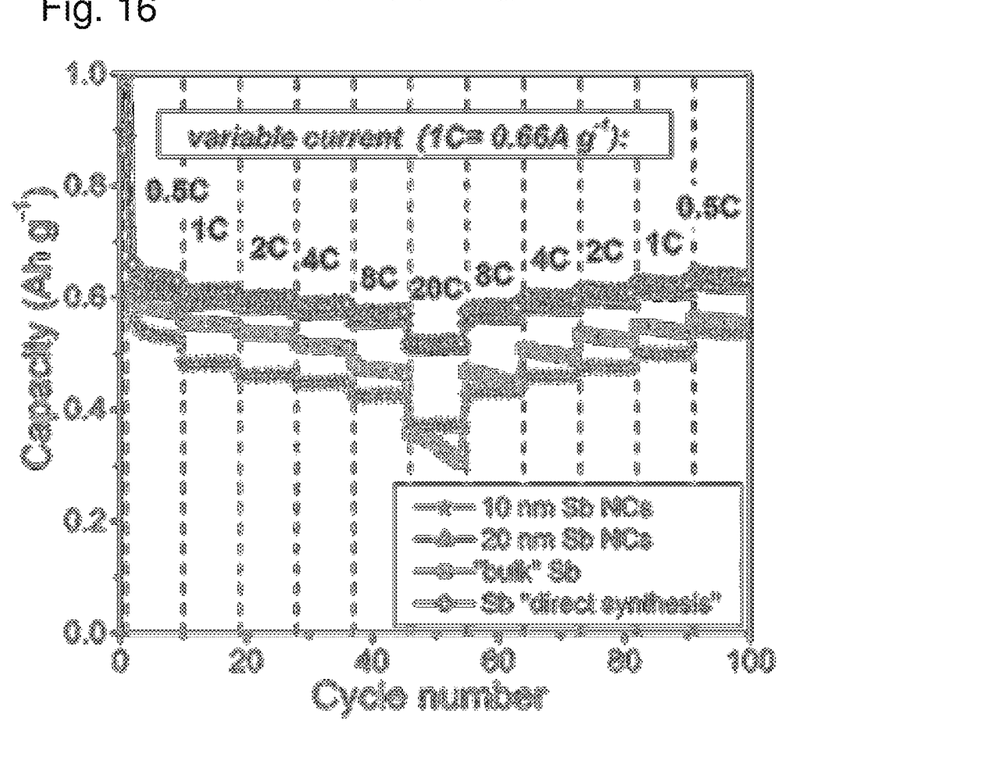
FIG. 16. Rate capability measurements for Sb-based anodes in Na-ion half cells.

FIG. 9 and FIG. 10 show the electrochemical performance of Sb NPs synthesized by the herein described procedure (in the following denoted as Sb NPs from direct synthesis) in comparison to monodisperse 10/20 nm Sb NPs and bulk Sb as published in He et al. [26]. In He et al. also a more detailed discussion of the performance of nanometer sized particles in comparison to bulk Sb can be found. Due to the similar average size of Sb NPs synthesized by direct synthesis compared to monodisperse Sb NPs, similar results in terms of cycling stability and rate capability were obtained for both Li-ion and Na-ion batteries. This might be explained by the fact, that washing the NPs with water is more efficient in removing all contaminations. Additionally, the absence of any surfactants, which can insulate particles, possibly gives rise to the observed enhanced capacities.

SnSb-Based Anodes

Figure 17:
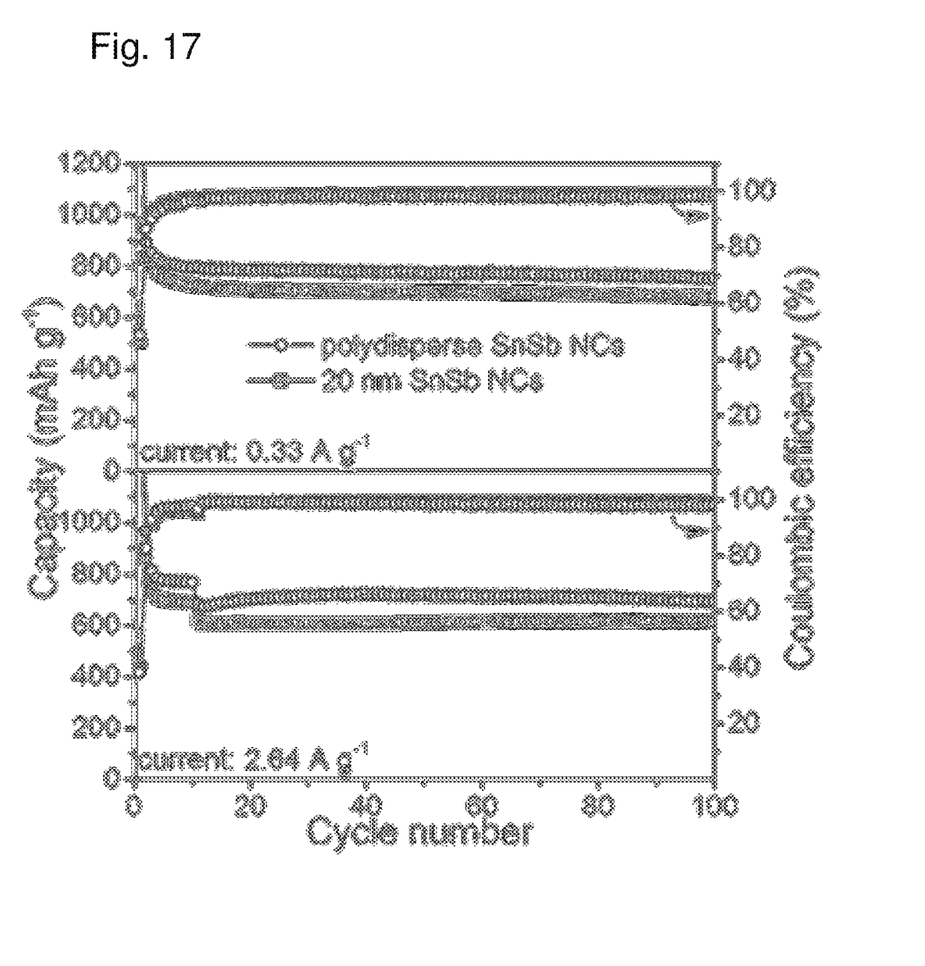
FIG. 17. Capacity retention for SnSb-based anodes in Li-ion half-cells at a current of 0.33 A $g^{-1}$ or 2.64 A $g^{-1}$. Before measurements at 2.64 A $g^{-1}$, batteries were cycled at 0.066 A $g^{-1}$ for two and afterwards at 0.33 A $g^{-1}$ for eight cycles. (Note: The electrochemical performance of 20 nm monodisperse was previously described in European patent application no. 13194946.3 and is shown here for comparison.)
Figure 18:
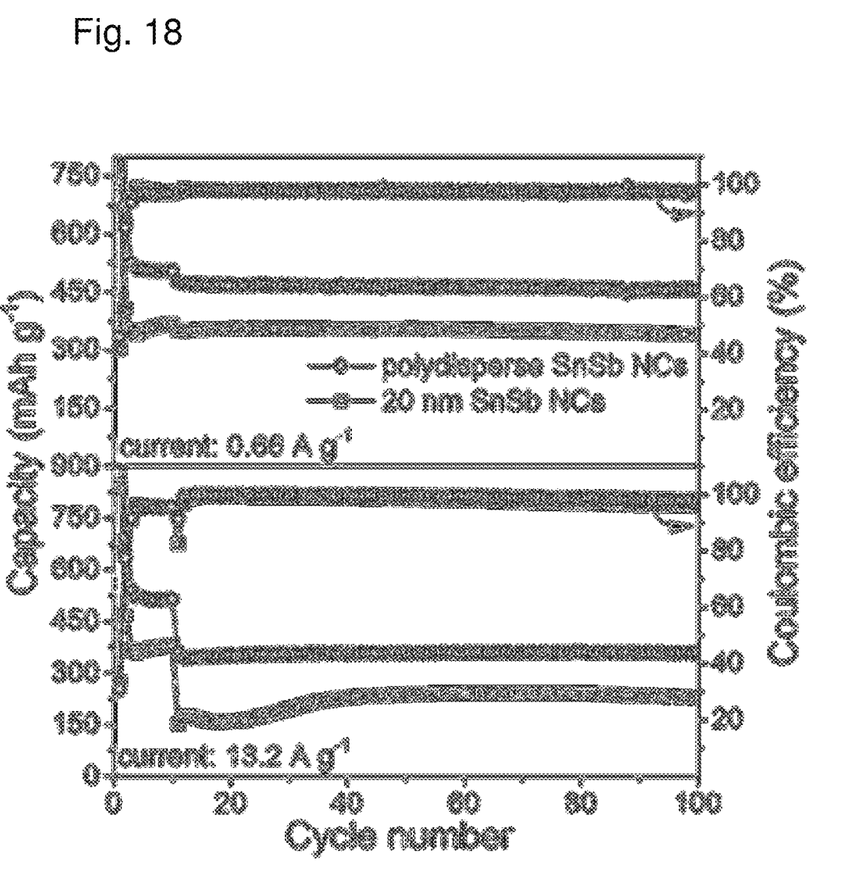
FIG. 18. Capacity retention for SnSb-based anodes in Na-ion half-cells at a current of 0.66 A $g^{-1}$ or 13.2 A $g^{-1}$. Before measurements batteries were cycled at 0.066 A $g^{-1}$ for two and afterwards at 0.33 A $g^{-1}$ for eight cycles. (Note: The electrochemical performance of 20 nm monodisperse was previously described in European patent application no.13194946.3 and is shown here for comparison.)
Figure 19:
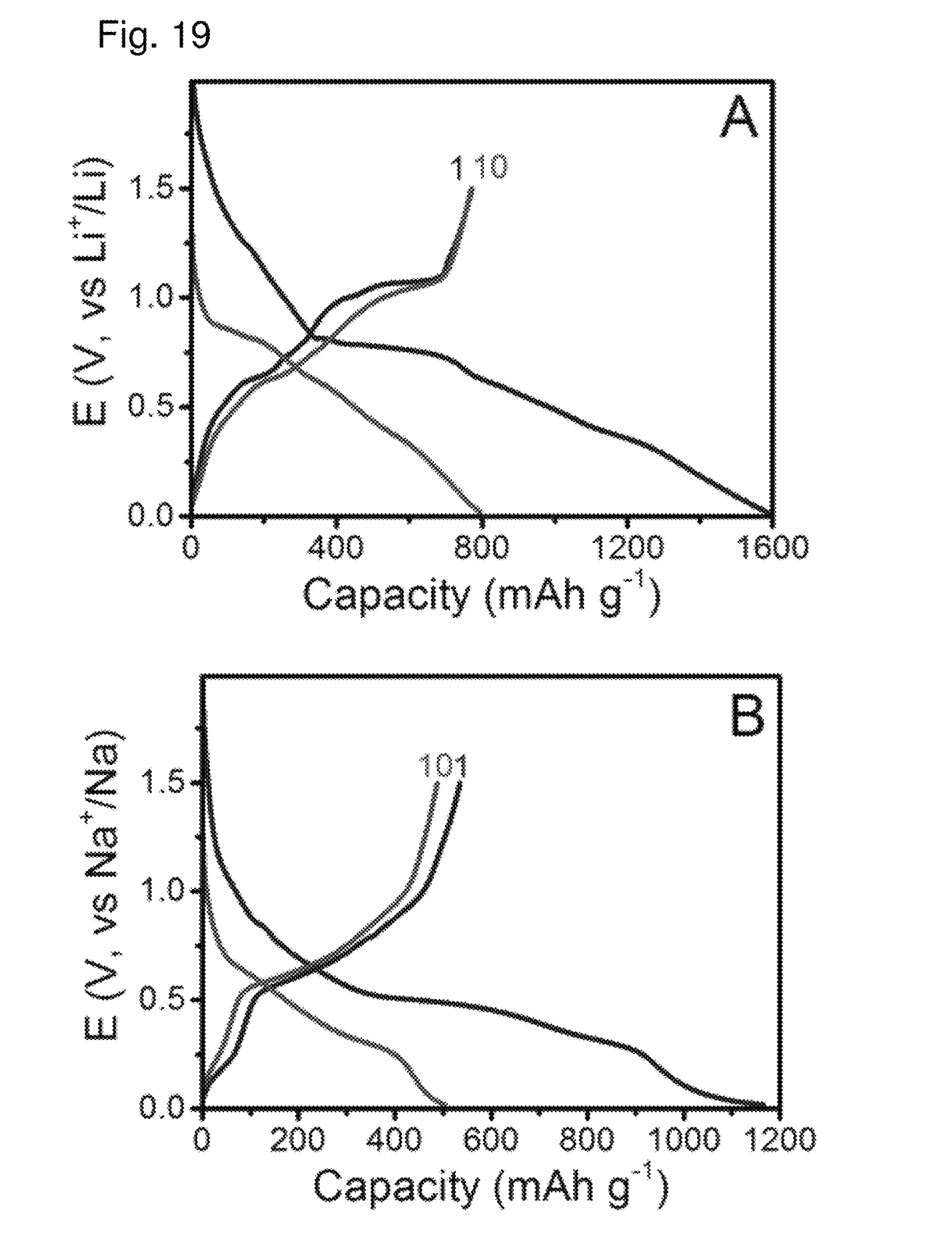
FIG. 19. Galvanostatic charge and discharge curves for the 1st and 10th cycle for polydisperse SnSb NPs corresponding to cycling experiments at 0.33 A $g^{-1}$ (A) and 0.66 A $g^{-1}$ (B) shown in FIGS. 17 and 18, respectively.

FIG. 17 and FIG. 19 show the electrochemical performance of SnSb NPs synthesized by the herein described procedure in comparison to monodisperse 20 nm SnSb NPs. The as-synthesized SnSb NPs showed the same cycling stability compared to monodisperse 20 nm Sb NPs for both Li-ion and Na-ion half cells, despite their polydispersity and larger average size. Moreover, these SnSb NPs show also in all cases higher capacity levels, most likely due to the removal of all residual contaminations by the washing procedure with water. In particular, such polydisperse SnSb NPs achieved stable capacities of 770 mAh g$^{-1}$ at 0.33 A g$^{-1}$ and 700 mAh g$^{-1}$ at 2.64 A g$^{-1}$ in Li-ion half cells. In comparison monodisperse 20 nm SnSb NCs showed capacities of 700 and 610 mAh g$^{-1}$ respectively. FIG. 19 shows the galvanostatic charge and discharge curves for SnSb NPs in Li-ion and Na-ion half cells. In contrast to pure Sb NPs [26], SnSb NPs show lower potentials for the delithiation/desodiation reaction. Therefore, SnSb NPs can even provide higher power compared to pure Sb NPs in a full cell.

In conclusion, SnSb NPs synthesized by the above described procedure showed excellent cycling stability and capacity retention for both Li-ion and Na-ion batteries.

While there are shown and described presently preferred embodiments of the invention, it is to be distinctly understood that the invention is not limited thereto but may be otherwise variously embodied and practiced within the scope of the following claims.

REFERENCES

[1] Palacin, M. R. *Chem. Soc. Rev.* 2009, 38, 2565.
[2] Goodenough, J. B.; Kim, Y. *Chem. Mater.* 2009, 22, 587.
[3] Hayner, C. M.; Zhao, X.; Kung, H. H. *Annual Review of Chemical and Biomolecular Engineering* 2012, 3, 445.
[4] Park, C.-M.; Kim, J.-H.; Kim, H.; Sohn, H.-J. *Chem. Soc. Rev.* 2010, 39, 3115.
[5] Zhu, Y.; Han, X.; Xu, Y.; Liu, Y.; Zheng, S.; Xu, K.; Hu, L.; Wang, C. *ACS Nano* 2013, 7, 6378.
[6] Magasinski, A.; Dixon, P.; Hertzberg, B.; Kvit, A.; Ayala, J.; Yushin, G. *Nat. Mater.* 2010, 9, 353.
[7] Chockla, A. M.; Klavetter, K. C.; Mullins, C. B.; Korgel, B. A. *Chem. Mater.* 2012, 24, 3738.
[8] Kovalenko, I.; Zdyrko, B.; Magasinski, A.; Hertzberg, B.; Milicev, Z.; Burtovyy, R.; Luzinov, I.; Yushin, G. *Science* 2011, 333, 75.
[9] Beattie, S. D.; Larcher, D.; Morcrette, M.; Simon, B.; Tarascon, J. M. *Journal of the Electrochemical Society* 2008, 155, 158.
[10] Chan, C. K.; Peng, H.; Liu, G.; McIlwrath, K.; Zhang, X. F.; Huggins, R. A.; Cui, Y. *Nat. Nanotech.* 2008, 3, 31.
[11] Mosby, J. M.; Prieto, A. L. *J. Am. Chem. Soc.* 2008, 130, 10656.
[12] Alcántara, R.; Jiménez-Mateos, J. M.; Lavela, P.; Tirado, J. L. *Electrochemistry Communications* 2001, 3, 639.
[13] Klavetter, K. C.; Wood, S. M.; Lin, Y.-M.; Snider, J. L.; Davy, N. C.; Chockla, A. M.; Romanovicz, D. K.; Korgel, B. A.; Lee, J.-W.; Heller, A.; Mullins, C. B. *Journal of Power Sources* 2013, 238, 123.
[14] Komaba, S.; Matsuura, Y.; Ishikawa, T.; Yabuuchi, N.; Murata, W.; Kuze, S. *Electrochemistry Communications* 2012, 21, 65.
[15] Ge, P.; Fouletier, M. *Solid State Ionics* 1988, 28-30, Part 2, 1172.
[16] Cao, Y.; Xiao, L.; Wang, W.; Choi, D.; Nie, Z.; Yu, J.; Saraf, L. V.; Yang, Z.; Liu, J. *Adv. Mater.* 2011, 23, 3155.
[17] Wang, L.; Lu, Y.; Liu, J.; Xu, M.; Cheng, J.; Zhang, D.; Goodenough, J. B. *Angew. Chem. Int. Ed.* 2013, 52, 1964.
[18] Park, C.-M.; Yoon, S.; Lee, S.-I.; Kim, J.-H.; Jung, J.-H.; Sohn, H.-J. *Journal of The Electrochemical Society* 2007, 154, A917.
[19] Caballero, Á.; Morales, J.; Sánchez, L. *Journal of Power Sources* 2008, 175, 553.
[20] Sung, J. H.; Park, C.-M. *J. Electroanal. Chem.* 2013, 700, 12.
[21] Park, C.-M.; Sohn, H.-J. *Chem. Mater.* 2008, 20, 3169.
[22] Darwiche, A.; Marino, C.; Sougrati, M. T.; Fraisse, B.; Stievano, L.; Monconduit, L. *J. Am. Chem. Soc.* 2013, 135, 10179.
[23] Baggetto, L.; Ganesh, P.; Sun, C.-N.; Meisner, R. A.; Zawodzinski, T. A.; Veith, G. M. *Journal of Materials Chemistry A* 2013, 1, 7985.

[24] Qian, J.; Chen, Y.; Wu, L.; Cao, Y.; Ai, X.; Yang, H. *Chem. Commun.* 2012, 48, 7070.
[25] Zhou, X.; Dai, Z.; Bao, J.; Guo, Y.-G. *Journal of Materials Chemistry A* 2013, 1, 13727.
[26] He, M.; Kravchyk, K.; Walter, M.; Kovalenko, M. V. *Nano Lett.* 2014, 14, 1255.
[27] Wang, Y. W.; Hong, B. H.; Lee, J. Y.; Kim, J.-S.; Kim, G. H.; Kim, K. S. *J. Phys. Chem. B* 2004, 108, 16723.
[28] Kieslich, G.; Birkel, C. S.; Stewart, A.; Kolb, U.; Tremel, W. *Inorg. Chem.* 2011, 50, 6938.
[29] Torisawa, Y.; Nishi, T.; Minamikawa, J. *Bioorg. Med. Chem. Lett.* 2001, 11, 2787.

What is claimed is:

1. A method for the production of $SbM_x$ nanoparticles, wherein

M is an element selected from the group consisting of Sn, Ni, Cu, In, Al, Ge, Pb, Bi, Fe, Co, Ga, and $0 \leq x < 2$, the method comprising:
preparing a solution containing an antimony salt and one or more metal salts in an anhydrous polar solvent and at least one solution of hydride in an anhydrous polar solvent, heating the solution containing the one or more metal salts to a reaction temperature, then injecting the solution of hydride into the solution containing the one or more metal salts to generate a reaction mixture and start a reduction reaction, wherein said antimony salt and said one or more metal salts are reduced with said hydride and form a solid product;
cooling said reaction mixture to room temperature immediately after the formation of the solid product; and
separating the solid product formed from the solution reaction mixture, and washing the product with water.

2. The method of claim 1, wherein the solid product formed from the reaction mixture is separated via centrifugation.

3. The method of claim 1, wherein M is Sn.

4. The method of claim 1, wherein M is Sn and x is 1.

5. The method of claim 1, wherein the reduction reaction is performed after elevating the reaction temperature by heating.

6. The method of claim 5, wherein the reduction reaction is performed at a temperature of 60±10° C.

7. The method of claim 1, wherein the hydride is selected from the group consisting of $NaBH_4$, lithium hydride, sodium hydride, potassium hydride, magnesium hydride, calcium hydride, tributyltinhydride, diisobutyl aluminum hydride, lithium aluminum hydride, lithium triethylborohydride and mixtures thereof.

8. The method of claim 7, wherein the hydride is $NaBH_4$.

9. The method of claim 1, wherein the anhydrous polar solvent is selected from the group consisting of 1-methyl-2-pyrrolidone (NW), hexamethylphosphoramide, 1,3-dimethyl-2-imidazolidinone, 1,3-dimethyl-3,4,5,6-tetrahydro-2(1H)-pyrimidinone, dimethylsulfoxide, sulfolane, glyme, diglyme, triethylene glycol dimethylether, and mixtures thereof.

10. The method of claim 9, wherein the anhydrous polar solvent is NMP.

11. The method of claim 1, wherein the antimony salt is selected from the group consisting of antimony chloride, antimony fluoride, antimony bromide, antimony iodide, antimony oxide or antimony sulfide, antimony sulfate, antimony acetate, potassium antimony tartrate hydrate, triphenylantimony, antimony ethoxide and mixtures thereof.

12. The method of claim 11, wherein the antimony salt is antimony chloride.

13. The method of claim 1, wherein the one or more metal salts include at least one salt selected from the group consisting of tin chloride ($SnCl_2$), tin fluoride, tin bromide, tin iodide, tin oxide, tin sulfide, sodium stannate trihydrate, tetrabutyltin, chlorides of Ni, Cu, in, Al, Ge, Pb, Bi, Fe, Co, Ga and mixtures thereof.

14. The method of claim 13, wherein the one or more metal salts includes a mixture of tin salts.

15. The method of claim 13, wherein the one or more metal salts includes tin chloride.

16. The method of claim 1, wherein the reduction reaction is performed in inert gas.

17. The method of claim 16, wherein the reduction reaction is performed in argon.

18. The method of claim 1, wherein the reduction reaction is performed in air.

19. The method of claim 1, wherein the reaction mixture is cooled to room temperature immediately after injecting the solution of hydride.

20. The method of claim 1, wherein the product is dried in a vacuum oven at room temperature, optionally with a previous additional washing with a low boiling water miscible solvent.

21. The method of claim 20, wherein the low boiling water miscible solvent is acetone.

22. A method for producing an anode comprising performing the method of claim 1 for producing $SbM_x$ nanoparticles, mixing the such obtained $SbM_x$ nanoparticles, carbon black, carboxy methyl cellulose (CMC) and demineralized water, coating the aqueous slurry obtained on a current collector and drying.

23. The method according to claim 1, wherein the anhydrous polar solvent is not dimethyl formamide.

* * * * *

UNITED STATES PATENT AND TRADEMARK OFFICE
CERTIFICATE OF CORRECTION

PATENT NO. : 9,966,593 B2
APPLICATION NO. : 14/745976
DATED : May 8, 2018
INVENTOR(S) : Maksym V. Kovalenko et al.

It is certified that error appears in the above-identified patent and that said Letters Patent is hereby corrected as shown below:

In the Specification

Column 2, Line 27, "triethylboronhydride" should read --triethylborohydride--

Column 5, Line 10, "SbM NPs" should read --$SbM_x$ NPs.--

Column 5, Line 29, "potasium" should read --potassium--

Column 6, Lines 29-30, "triethylboronhydride" should read --triethylborohydride--

Column 8, Line 13, "potasium" should read --potassium--

In the Claims

Column 11, Line 33, Claim 1, "from the solution" should read --from the--

Column 12, Line 3, Claim 9, "(NW)" should read --(NMP)--

Column 12, Line 22, Claim 13, "in," should read --In,--

Signed and Sealed this
Twenty-first Day of May, 2019

Andrei Iancu
*Director of the United States Patent and Trademark Office*